April 3, 1934.   L. C. MUELLER   1,953,186
LAWN MOWER ATTACHMENT
Filed June 10, 1933   2 Sheets-Sheet 2

Inventor
Louis C. Mueller,
By Clarence A. O'Brien
Attorney

Patented Apr. 3, 1934

1,953,186

UNITED STATES PATENT OFFICE 1,953,186

LAWN MOWER ATTACHMENT

Louis C. Mueller, Appleton, Wis.

Application June 10, 1933, Serial No. 675,321

1 Claim. (Cl. 56—238)

This invention appertains to new and useful improvements in attachments for lawn movers and more particularly to a cutter attachment whereby dandelion stems and other high growths can be severed before the mower rides thereover.

The principal object of the present invention is to provide a cutter attachment for lawn mowers which can be readily attached and adjusted for use under various conditions.

Other important objects and advantages of the invention will become apparent to the reader of the following specification.

In the drawings:

Figure 3 represents a fragmentary elevational view of one of the cutter blades.

Figure 4 represents a side elevational view of one of the clamp structures.

Figure 1:
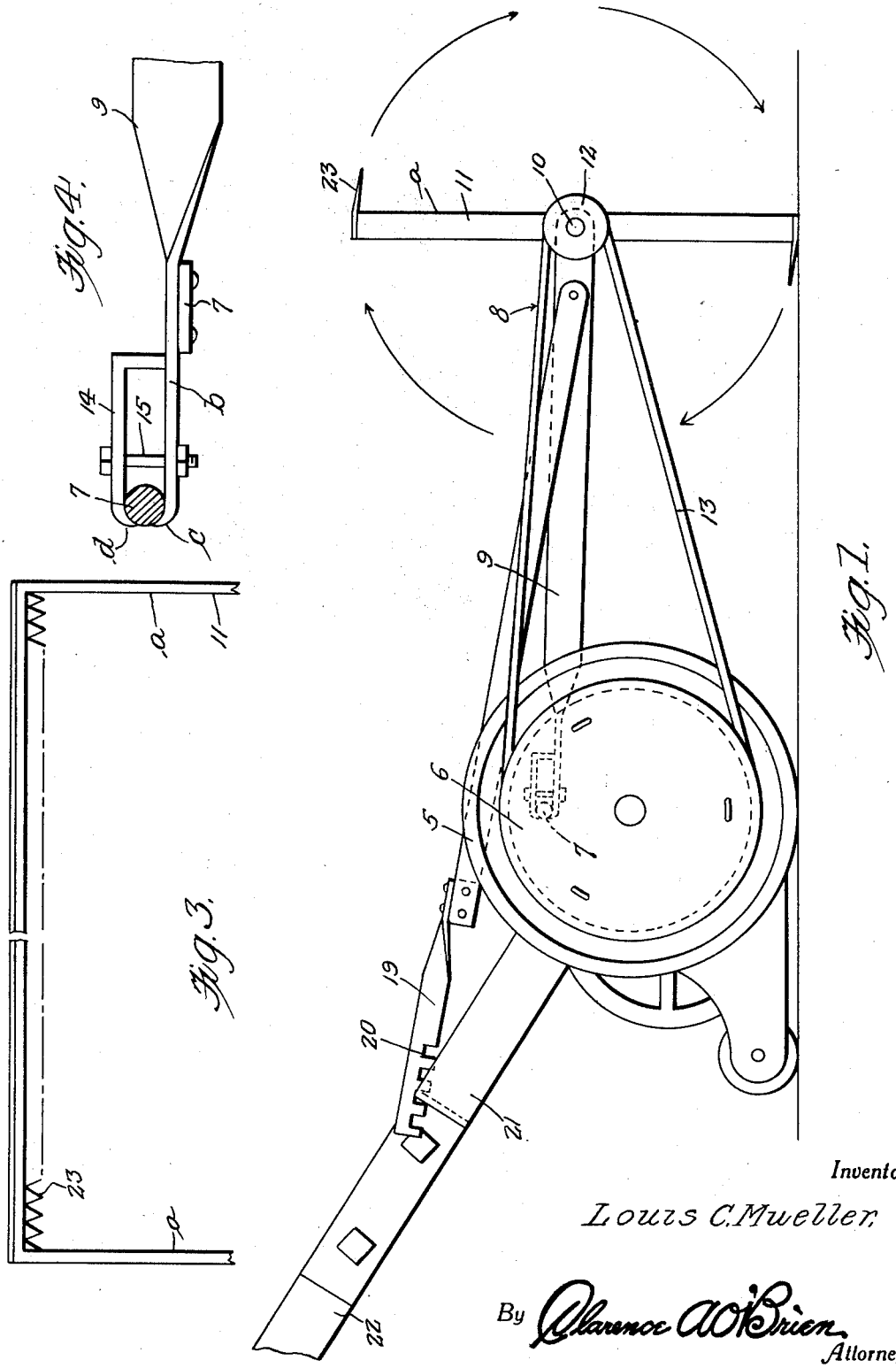
Figure 1 represents a side elevational view of the attachment installed on a lawn mower.
Figure 2:
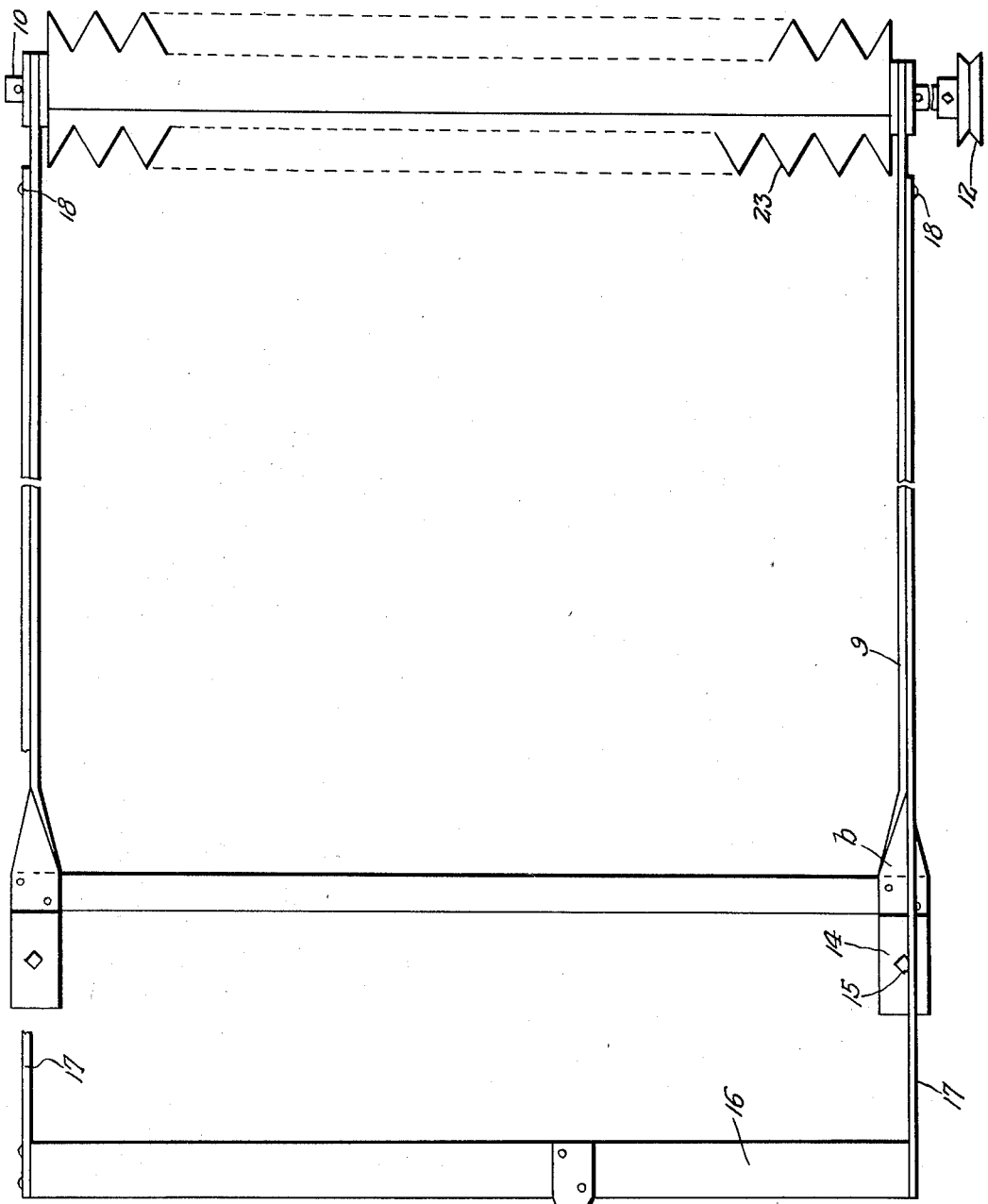
Figure 2 represents a top plan view of the attachment.

Referring to the drawings wherein like numerals designate like parts, it can be seen that numeral 5 represents one of the lawn mower wheels and this is equipped with a pulley 6 on one side thereof.

Numeral 7 represents the usual tie rod between the two assemblies of the lawn mower which assists in securing the same in proper spaced relation.

The rotary reel is generally referred to by numeral 8 and includes a pair of side members 9—9 which, at their forward ends, are provided with openings to receive the reel shaft 10. A rectangular shaped frame 11 has the shaft 10 extending through the end members A—A thereof and this frame is otherwise secured and serves to rotate with the shaft 10. A small pulley 12 is located on one end of the shaft 10 and a belt 13 is trained over the pulleys 6 and 12 so that the shaft 10 will be rotated as the wheel 5 of the lawn mower rotates.

The inner end of each of the side bars 9 is twisted as at $b$ and curved laterally, as at $c$. An L-shaped clamp member 14 is associated with this end $b$ and is provided with a laterally curved end portion $d$. The curved end portions $c$ and $d$ are clamped against the tie rod 7, as shown in Figure 4, and a bolt 15 passing through the clamp member 14 and the end portion $b$ of the side member 9, serves to secure this end portion of the side member securely to the rod 7.

A cross member 16 has two leg members 17—17 extending from the ends thereof and pivotally connected, as at 18, their forward ends to the forward end portions of the side members 9. This frame denoted by the leg members 17—17 and cross member 16, acts as a suspender for the cutter, the same being provided with a shank 19 having notches 20 therein to receive the yoke portions 21 which connects the lawn mower handle 22 to the lawn mower proper.

Thus by properly engaging the shank 19 with the yoke 21, a predetermined elevation of the reel can be obtained. The side portions of the rectangular shaped frame 11 are provided with laterally disposed blades 23 which serve to cut the growth against which they strike.

While the foregoing specification sets forth the invention in specific terms it is to be understood that various changes in the shape, size and materials may be restorted to without departing from the spirit and scope of the invention as claimed hereinafter.

Having described the invention, what is claimed as new is:

An attachment for lawn mowers comprising a pair of side bars, a cutting reel mounted between a pair of adjacent ends of the bars, means whereby the reel is rotated by the mower to which it is attached and clamps at the remaining ends of the bars to attach the said bars to a tie rod of the lawn mower, said clamps each consisting in providing the clamp ends of the bars with an upstanding lip, an L-shaped clamp member having its foot portion bearing against the bar and its horizontal portion provided with a downturned lip, said lips being adapted for engagement with the tie rod of the lawn mower, and an adjusting element between the clamp end of the bar and the said clamping member whereby the said lip portions can be contracted against the lawn mower tie rod, and a member extending from the outer ends of the bars and provided with means thereon for engaging the usual handle yoke of the lawn mower to sustain the cutting reel in a predetermined position.

LOUIS C. MUELLER.